United States Patent
Mishra et al.

(10) Patent No.: US 9,020,122 B2
(45) Date of Patent: Apr. 28, 2015

(54) METHOD AND APPARATUS FOR TAGGING OUTGOING TELEPHONY CALLS

(75) Inventors: Prashant Mishra, Pune (IN); Barkha Shukla, Maharashtra (IN)

(73) Assignee: Avaya Inc., Basking Ridge, NJ (US)

( * ) Notice: Subject to any disclaimer, the term of this patent is extended or adjusted under 35 U.S.C. 154(b) by 565 days.

(21) Appl. No.: 12/783,277

(22) Filed: May 19, 2010

(65) Prior Publication Data

US 2011/0286589 A1    Nov. 24, 2011

(51) Int. Cl.
*H04M 3/42* (2006.01)
*H04M 1/64* (2006.01)
*H04M 3/22* (2006.01)
*H04M 15/00* (2006.01)
*H04M 15/06* (2006.01)

(52) U.S. Cl.
CPC ........ *H04M 3/2218* (2013.01); *H04M 3/42365* (2013.01); *H04M 15/00* (2013.01); *H04M 15/06* (2013.01); *H04M 15/44* (2013.01); *H04M 15/58* (2013.01)

(58) Field of Classification Search
USPC .......................................................... 379/67
See application file for complete search history.

(56) References Cited

U.S. PATENT DOCUMENTS

| | | | |
|---|---|---|---|
| 5,146,490 A | | 9/1992 | Beckman |
| 5,388,150 A | * | 2/1995 | Schneyer et al. .......... 379/88.19 |
| 5,940,488 A | * | 8/1999 | DeGrazia et al. .......... 379/93.23 |
| 5,999,611 A | * | 12/1999 | Tatchell et al. .......... 379/211.02 |
| 6,240,164 B1 | | 5/2001 | Jensen |
| 6,882,709 B1 | * | 4/2005 | Sherlock et al. .......... 379/90.01 |
| 6,904,137 B2 | | 6/2005 | Brandt et al. |
| 7,561,682 B2 | * | 7/2009 | Doherty et al. .......... 379/221.09 |
| 7,580,513 B2 | | 8/2009 | Gruchala et al. |
| 2002/0126821 A1 | | 9/2002 | Barak et al. |
| 2005/0117729 A1 | * | 6/2005 | Reding et al. ................. 379/196 |
| 2006/0002536 A1 | * | 1/2006 | Ambrose ................. 379/201.01 |
| 2006/0062205 A1 | | 3/2006 | Doherty et al. |
| 2007/0064886 A1 | | 3/2007 | Chui et al. |
| 2008/0075250 A1 | * | 3/2008 | Kent et al. ..................... 379/133 |
| 2010/0272245 A1 | * | 10/2010 | Brunson .................... 379/88.11 |

FOREIGN PATENT DOCUMENTS

| | | |
|---|---|---|
| CN | 1728744 | 2/2006 |
| CN | 10122662 | 8/2007 |

(Continued)

OTHER PUBLICATIONS

Official Action and Search Report for Chinese Patent Application No. 201110138888.1, mailed Oct. 12, 2013, 8 pages.

(Continued)

*Primary Examiner* — Joseph T Phan
(74) *Attorney, Agent, or Firm* — Sheridan Ross P.C.

(57) ABSTRACT

Systems and methods for determining and providing call disposition information for outgoing calls are provided. More particularly, the disposition of a call placed from a communication device is determined, and associated with a call log for that communication device. The call disposition information is displayed or otherwise output to a user when the call log is accessed by the user. The call disposition information can be determined by a call disposition application running on a communication server that provides the call disposition information to a communication device for display by that communication device.

20 Claims, 4 Drawing Sheets

(56) References Cited

FOREIGN PATENT DOCUMENTS

| | | |
|---|---|---|
| CN | 101455037 | 6/2009 |
| EP | 1361731 | 11/2003 |
| WO | WO 2004/049136 | 6/2004 |

OTHER PUBLICATIONS

Official Action with English Translation for Germany Patent Application No. 102011101967.0, dated Apr. 28, 2014 11 pages.

English Translation of Official Action for China Patent Application No. 201110138888.1, dated Jul. 3, 2014 8 pages.

* cited by examiner

METHOD AND APPARATUS FOR TAGGING OUTGOING TELEPHONY CALLS

FIELD

Methods and systems for tagging the disposition of outgoing telephony calls at the originating end are provided.

BACKGROUND

Telephony communication devices are typically associated with call logs. These call logs generally consist of a list of calls associated with the communication device. The calls may be differentiated as incoming, outgoing, or missed. In addition, the calls included in a call log may be identified by the called party, where caller ID information is available, the called telephone number, and the date and time of the call.

Particularly for users who handle a large number of calls, additional detail would be useful. However, there currently is no way for a user to check his or her own call log to find out the disposition of outgoing calls. Instead, current call logs only allow the user to see that an outgoing call was dialed, without providing information on the final status of the outgoing call.

SUMMARY

The present invention is directed to solving these and other problems and disadvantages of the prior art. Generally, according to embodiments of the present invention, the disposition of an outgoing call is determined, and is included in a call log. This disposition information generally comprises the final state of each outgoing call placed from the communication device. Examples of possible dispositions include unanswered, answered, transferred, conferenced, forwarded, and landed in voicemail.

In accordance with embodiments of the present invention, the disposition of an outgoing call placed from a communication device may be determined in connection with the operation of a communication server. The communication server may comprise a private branch exchange, or another communication server device associated with handling one or more outgoing calls placed from the communication device. More particularly, the disposition of outgoing calls may be determined through the operation of application programming running on a communication server associated with handling outgoing calls placed from the communication device. The disposition of the outgoing call may comprise information that is placed in a call log, such as an outgoing call log, and that call log can be made available to a user of the communication device, an administrator, or an agent of that user.

In accordance with further embodiments of the present invention, outgoing calls placed from a communication device are detected. For each such outgoing call, a final state or disposition is determined. The determined final state or disposition is then added to a call log entry for the outgoing call. The outgoing call log entry and associated disposition can be viewed or otherwise accessed by a user of the communication device from which the outgoing call was placed, an administrator, or an agent of that user, at a later time. For example, the outgoing call log, including the disposition for outgoing calls, can be viewed using a display provided by or associated with the communication device.

Additional features and advantages of embodiments of the present invention will become more readily apparent from the following description, particularly when taken together with the accompanying drawings.

DETAILED DESCRIPTION

Figure 1:
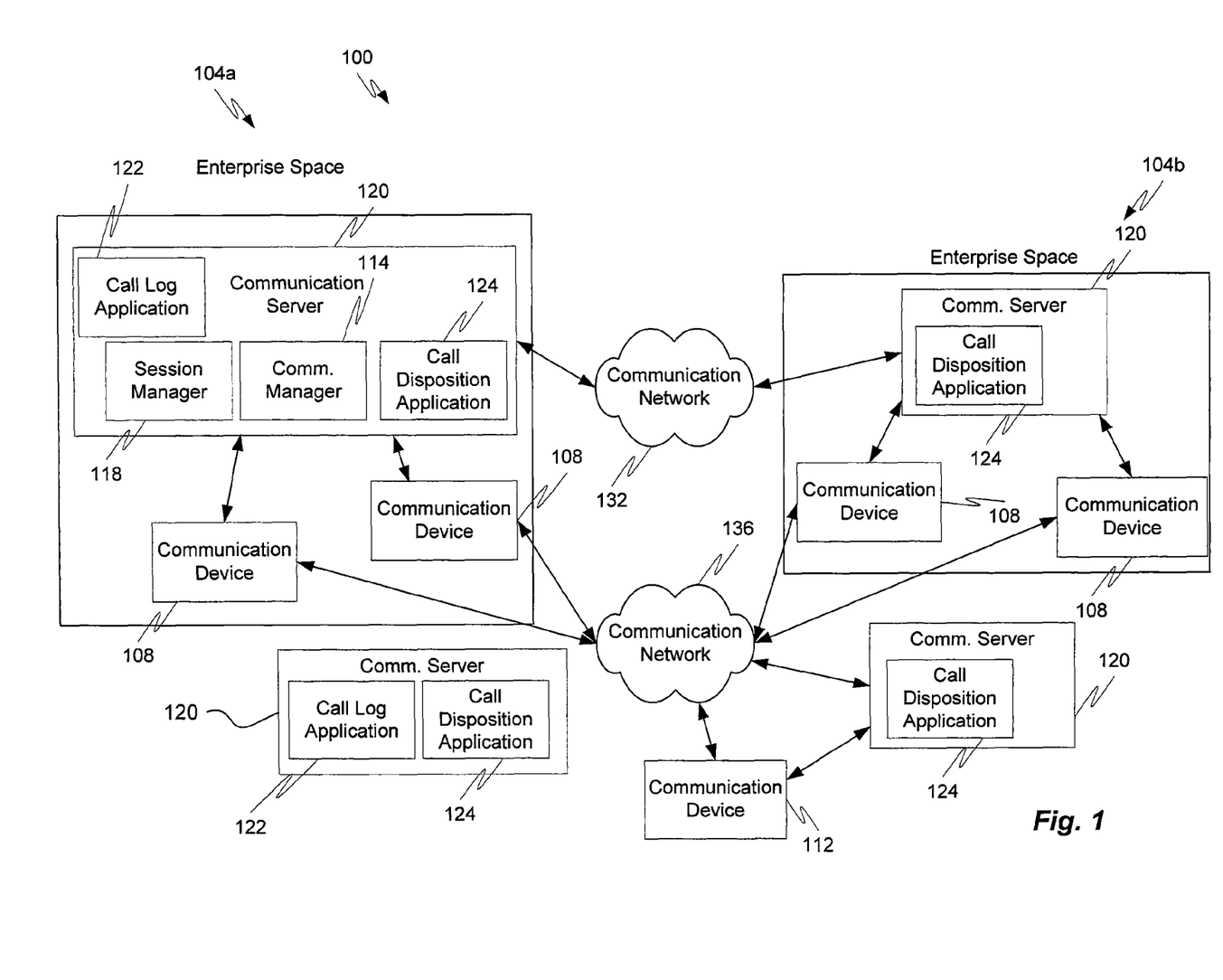
FIG. 1 depicts components of a communications system in accordance with embodiments of the present invention.

FIG. 1 is a block diagram depicting components of a communication system 100 in accordance with embodiments of the present invention. In general, the communications system 100 includes provisions for indicating a disposition of an outgoing call as described herein. The communications system 100 generally comprises a plurality of communication devices or endpoints 108, 112 that are or may be in communication with one another using a number of possibly different communication modalities. In some embodiments, the communications system 100 includes two or more domains or enterprises 104a, 104b, which may be owned and operated by the same or different entities or companies.

One or both enterprises 104a, 104b may comprise one or more communication devices or endpoints 108 that allow users in the enterprise to communicate with other users within the enterprise or with users outside of the enterprise. In particular, the communication devices 108 may be connected to a communication network 136, which facilitates communications with other non-enterprise communication devices or endpoints 112. Moreover, the communication network 136 may interconnect communication devices 108 in different enterprise domains. The boundaries of the enterprise space 104a, 104b may be defined by network boundary devices, such as session border controllers (SBCs), gateways, or the like.

In some embodiments, the enterprise space 104a, 104b may include dedicated communications equipment or devices, thereby creating a local communication network from the enterprise space 104a, 104b. In particular, the enterprise space 104a, 104b may include a local area network (LAN), a wide area network (WAN), a session initiation protocol (SIP), or the like. The initiation and control of communications sessions, and the provision of features for such sessions, may be controlled or assisted by the operation of a communication manager 114 associated with a communication server or communication core 120. Moreover, the communication manager 114 may comprise or be provided as part of an Internet protocol (IP) private branch exchange (PBX), such as the AVAYA AURA SESSION MANAGER, or a Digital Communication Protocol (DCP) device. In addition, an enterprise communication manager 114 can comprise a digital telephony and/or public switched telephony network (PSTN) based infrastructure. The communication manager 114 may provide an Internet protocol telephony platform for an enterprise.

The communication server 120 may also include a session manager 118. The session manager may be provided as part of or may comprise a communication core. In accordance with embodiments of the present invention, the session manager 118 may be provided as part of an AVAYA AURA SESSION MANAGER. The session manager 118 may perform various functions, such as call routing and session initiation protocol (SIP) trunking.

The communications system 100 may include a call log application or module 122. The call log application may operate to create a log or list of calls associated with communication devices 108, 112. More particularly, a call log may be generated for some or all of the communication devices 108, 112 included in the communications system 100. As can be appreciated by one of skill in the art, the call log application 122 can be integrated into other components of the communications system 100, in addition or as an alternative to running as a stand alone application on a communication server 120 or other network node. For example, a call log application 122 can be provided as part of a session manager 118, communication manager 114, or other network node or module.

In accordance with embodiments of the present invention, the communications system 100 includes a call disposition application or module 124. The call disposition application 124 generally functions to determine the disposition of a call placed from a communication device 108, 112, and to provide such information to or as part of a call log. For example, the call disposition application 124 may operate to provide call disposition information to a call log application 122 for placement in a call log for the communication device 108, 112 from which the call was placed. In accordance with still other embodiments, the functions otherwise performed by a call log application 122 may be performed by the call disposition application 124. In accordance with embodiments of the present invention, the call disposition application 124 can operate to obtain information from messages sent across or using at least portions of the communications system 100 regarding calls originating from a communication device 108 or 112. For example, in connection with a communications system 100 that incorporates the use of SIP messages, information contained in such messages regarding calls placed from a communication device 108, 112 may be interrogated or considered in order to obtain disposition information regarding the outgoing call. Alternatively or in addition, other call signaling messages or status information from a communication server 120 or components of a communication server 120 can be used as the source of call disposition information that is collected by the call disposition application 124.

A call disposition application 124 in accordance with embodiments of the present invention may be executed or implemented by a communications server 120. The communications server 120 on which a call disposition application 124 is executed may be provided as part of an enterprise space 104a or 104b, as a stand alone server 120, or in some other combination. In addition, the communication server 120 on which a call disposition application 124 in accordance with embodiments of the present invention is executed may also execute or comprise a communication manager 114 and/or session manager 118. Accordingly, it should be appreciated that a call disposition application 124 may be provided by a communication server 120 that comprises or provides functions of a PBX in the case of a communication device 108 associated with an enterprise 104a, 104b, or by a communication server 120 associated with a service provider, for example in the case of a communication device 112 that is not associated with an enterprise, such as a home telephone. Accordingly, a call disposition application 124 may provide a service that is available as a value added service to users of communication devices 108, 112, whether those communication devices are associated with an enterprise 104a, 104b, or are connected to the public switched telephony network (PSTN), or otherwise. The services provided by the call disposition application 124 may further be provided as a software as a service (SaaS). Moreover, the call disposition application 124 services may be available on a subscription basis, a per use basis, or as part of a communication services package or bundle. In addition, it should be appreciated that a call disposition application 124 is or may be compatible with sequenced applications or other services made available in connection with communications sessions established over a communications system 100.

The one or more communication networks 132, 136 interconnecting communication devices 108, 112 and/or communication servers 120 may be separate and distinct, or combined. Moreover, a communication network 132, 136 may comprise any type and/or any number of communication mediums and devices that are capable of supporting communication sessions, such as voice calls, video calls, chats, emails, TTY calls, multimedia sessions, or the like. A communication network 132, 136 may include a LAN, a WAN, a SIP network, and any other type of packet switched or circuit switched network known in the art. In addition, it can be appreciated that a communication network 132, 136 need not be limited to any one network type, and instead may be comprised of a number of different networks and/or network types. A communication network 132, 136 may include an IP multimedia subsystem (IMS) network, an architectural SIP standard well known in the art, or any other type of network that provides access to one or more of the Internet, a standard plain old telephony system (POTS), an integrated services digital network (ISDN), public switched telephony network (PSTN), and any type of wireless communication network, such as a cellular communication network. Accordingly, a communication network 132, 136 is equipped to facilitate communications between communication devices 108 and/or 112, communication servers 120, and/or other communications system nodes or components.

Figure 2:
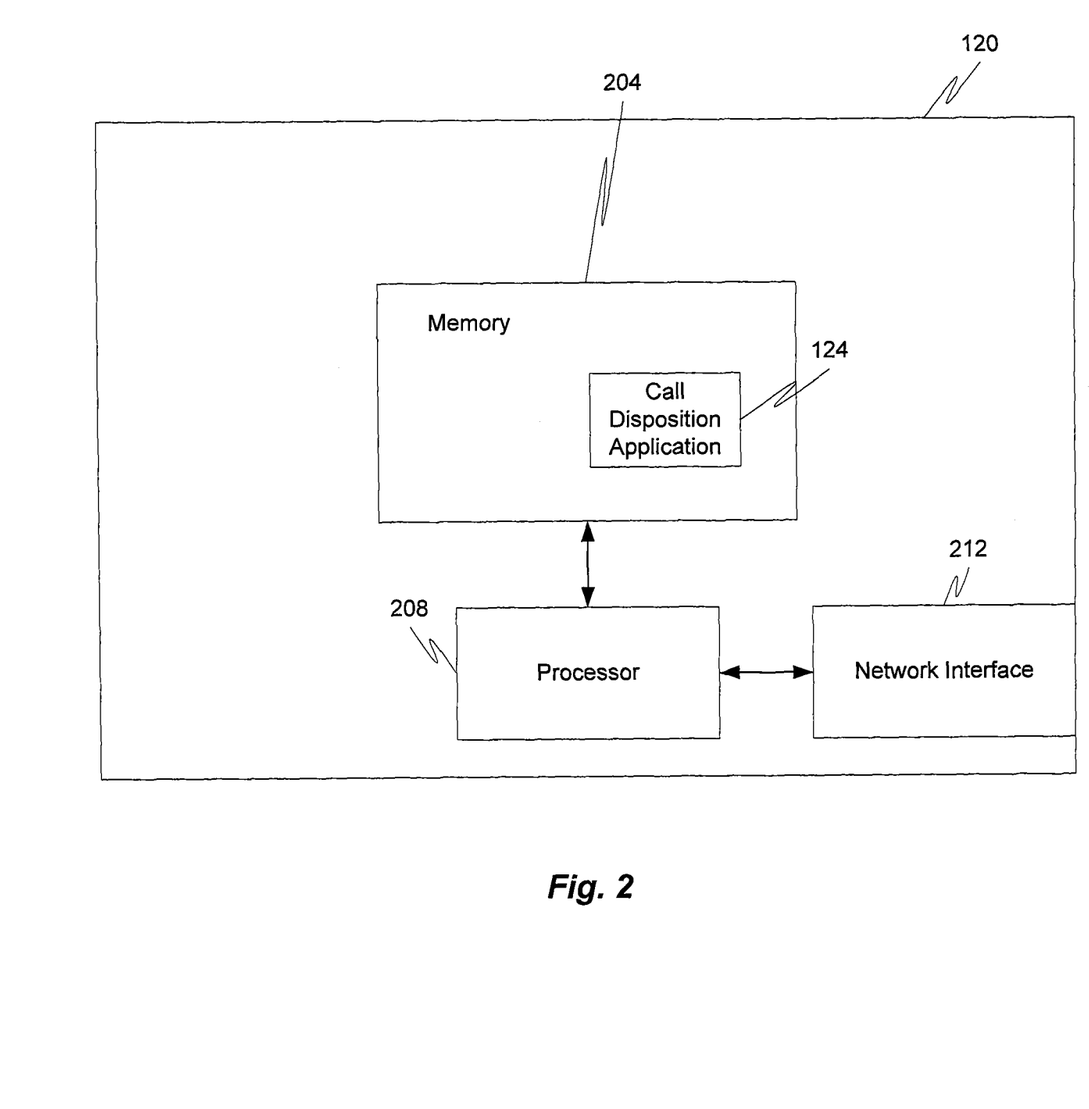
FIG. 2 depicts components of a communication server in accordance with embodiments of the present invention.

With reference now to FIG. 2, additional details of a communication server 120 that includes a call disposition application 124 providing features for determining the disposition of an outgoing call placed by a communication device 108, 112 and adding such disposition information to a call log for a communication device 108, 112 are illustrated. The call disposition application 124 may be provided as instructions in memory 204 that are executable by a processor 208 co-located with or interconnected to the memory 204. Results of the execution of the call disposition application 124 instructions or code may be shared with other applications or modules running on the communication server 120, or on an interconnected communication server 120 or other device. Moreover, results of the execution of the call disposition application 124 can be shared with other devices, nodes, applications or modules via a network interface 212 also included in the communication server 120. More particularly, the results of execution of the call disposition application 124 can be shared with a communication device 108, 112 that has placed outgoing calls for which a disposition has been determined by the call disposition application 124. Alternatively or in addition, the call disposition application 124 may receive information via the network interface 212. Received information can include information regarding the disposition of calls placed from a communication device 108, 112. Moreover, such call disposition information may, but need not, be in the form of communication session messages that include information indicating the disposition of a call. As another example, such information may be in the form of a call log generated by a call log application 122 running on the same or a different communication server 120 as the call disposition application 124 for use or enhancement by the call disposition application 124, such that a call log comprising an outgoing call log that includes call disposition information is provided or shared with other devices, nodes, applications or modules. The call disposition application 124 can be executed by a dedicated communication server 120. Alternatively, the call disposition application 124 may be executed by a server 120 that also executes other applications, such as a call log application 122, communication manager 114 function, and/or a session manager 118 function. In addition, a communication server 120 can provide other services, such as voicemail recording, or other services.

The memory 204 included in the communication server 120 may be provided for use in connection with the execution of programming by the processor 208, and for the temporary or long term storage of program instructions and/or data, such as the call disposition application 124. Alternatively or in addition, data storage may be provided that is separate from the memory 204. The memory 204 may comprise a solid state memory device. The memory 204 may also comprise a hard disk drive or other random access memory. In accordance with still other embodiments, the memory 204 may provide random access storage and/or read only storage. The communication server 120 processor 208 can include any general purpose programmable processor, digital signal processor (DSP) or controller for executing application programming. Alternatively, the processor 208 can comprise a specially configured application specific integrated circuit (ASIC).

The network interface 212 may comprise a communication modem, a communication port, a network interface, or any other type of device adapted to condition packets for transmission across a communication network 132, 136 to a destination communication device, communication server 120, or node, as well as condition received packets for processing by the processor 208. Examples of network interfaces 212 include, without limitation, a network interface card, a modem, a wired telephony port, a serial or parallel data port, radio frequency broadcast transceiver, a USB port, other wired or wireless communication network interfaces.

As can be appreciated by one of skill in the art, communications session messages can be used to establish a communications session and/or to invoke features and resources of a communications system 100. These communications systems messages can include invite and response messages, such as are used in implementing a SIP based communications system. Moreover, each module, application, or server that has received an invite message as part of the establishment or maintenance of a communications session will generally pass a message back to a preceding device. Therefore, in accordance with at least some embodiments of the present invention, a call disposition application 124 can operate to determine the disposition of a call placed from a communication device 108, 112 from communications session messages sent between at least two components of a communication system 100 regarding a communications session, requested communications session, or other call outgoing with respect to a communications device 108, 112. In accordance with further embodiments of the present invention, a call disposition application 124 can determine the disposition of a call placed from a communication device 108, 112 from status information received from the communication server 120 on which the call disposition application 124 is running, or from other communication servers 120 or nodes of the communications system 100.

Figure 3:
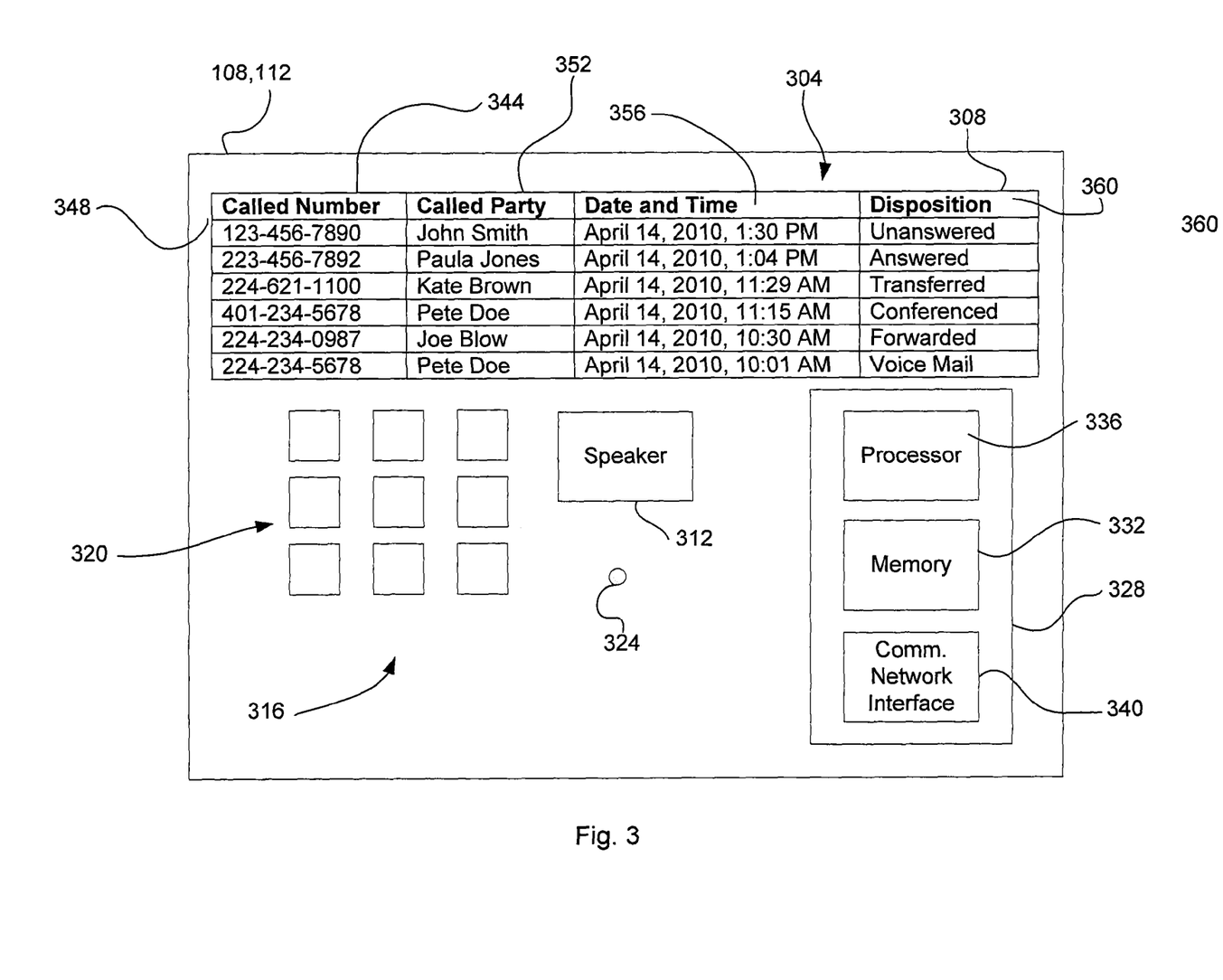
FIG. 3 depicts components of a communication device in accordance with embodiments of the present invention.

With reference now to FIG. 3, aspects of a communication device 108, 112 in accordance with embodiments of the present invention are illustrated. In general, the communication device 108, 112 includes or is associated with one or more user output devices 304. As illustrated, examples of user output devices 304 include a visual display 308 and/or an audio output, such as a speaker 312. The communication device 108, 112 may further include user inputs 316. As illustrated, examples of user inputs 316 includes hard or soft touch keys 320, and a microphone 324. In addition, internal components 328 of a communication device 108, 112 can include memory 332, a processor 336, and a communication network interface 340. As can be appreciated by one of skill in the art, the memory 332 may operate in association with the processor 336 to execute program instructions or code for performing functions of the communication device 108, 112. Such functions can include support for communications sessions in which the communication device 108, 112 participates as an endpoint, for example via connection to a communication network 132, 136 that is interconnected to the communication device 108, 112 through the communication network interface 340. In addition, functions provided can include the display of a call log. Moreover, the call log may comprise an outgoing call log.

The visual display 308 in the example of FIG. 3 includes an example of the type of information that can be displayed to a user of a communication device 108, 112 as a result of the operation of a call disposition application 124 in accordance with embodiments of the present invention. In particular, the information may comprise an outgoing call log 344 that presents called number 348, called party 352, date and time 356, and disposition 360 information to a user. Possible dispositions 360 include, but are not limited to, unanswered, answered, transferred, conferenced, forwarded, and transferred to voicemail. As can be appreciated by one of skill in the art after consideration of the present disclosure, the disposition information 360 provided by operation of the call disposition application 124 in accordance with embodiments of the present invention, allows a user to access a record of the disposition of an outgoing call (i.e., a call placed from a communication device 108, 112). Moreover, although four categories of information for each outgoing call are depicted in the example, all four categories are not necessary to a particular implementation of embodiments of the present invention. Moreover, alternative or additional categories of information can be included. In addition, the disposition 360 information can be included in call log information that includes listings of incoming and/or aborted calls.

Figure 4:
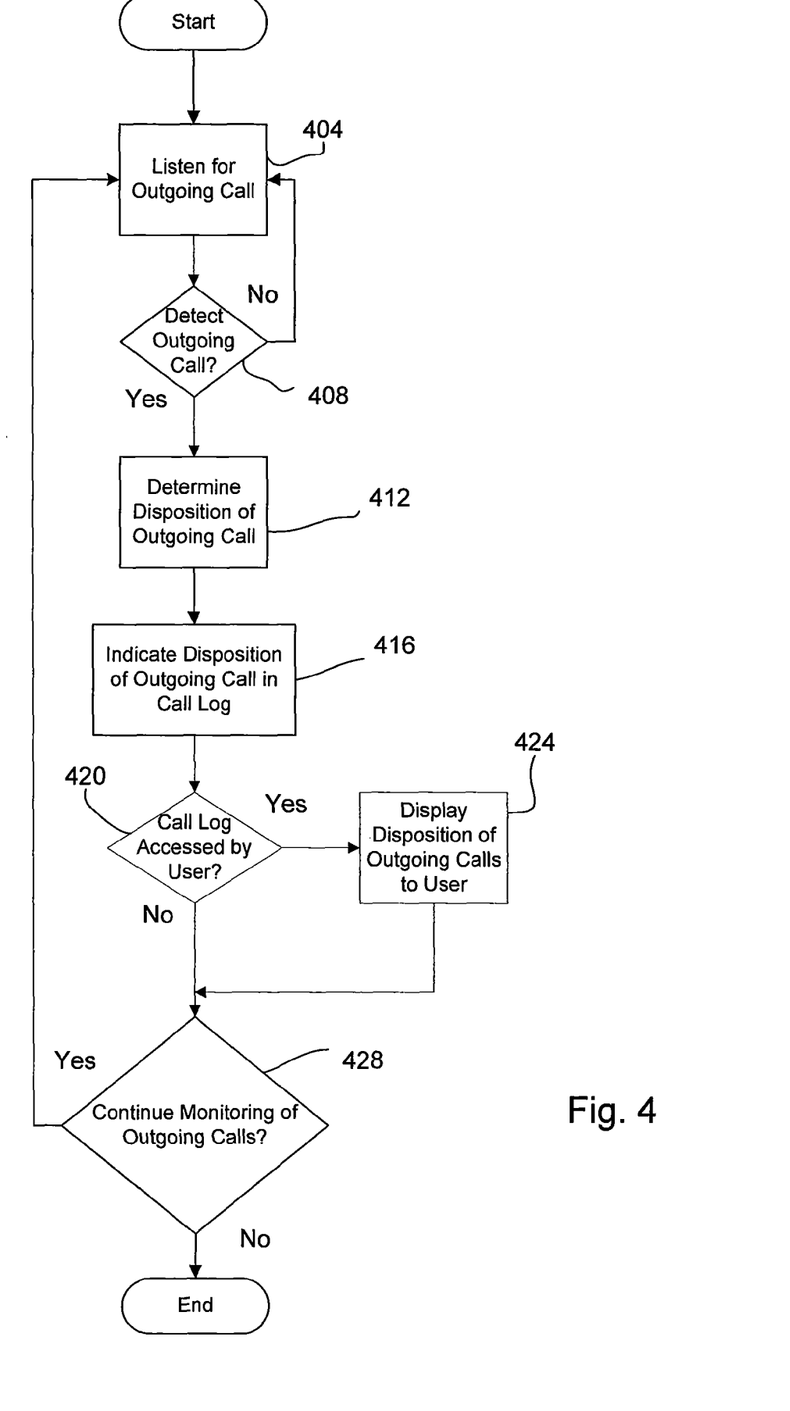
FIG. 4 is a flowchart depicting aspects of the operation of a communication system in accordance with embodiments of the present invention.

With reference now to FIG. 4, aspects of the operation of a communications system providing disposition information for outgoing calls or calls placed from a communication device 108, 112 are illustrated. As can be appreciated by one of skill in the art after consideration of the present disclosure, such operations may be performed in association with the execution of a call disposition application 124 executed by a communication server 120. Initially, at step 404, the call disposition application 124 listens for an outgoing call. As used herein, an outgoing call is a call placed from a communication device 108, 112 for which call disposition services are provided. At step 408, a determination is made as to whether an outgoing call has been detected. If no outgoing call is detected, the call disposition application 124 continues to listen for outgoing calls.

Once an outgoing call is detected, the disposition of the outgoing call is determined (step 412). In general, the disposition of the outgoing call may be determined from communication session messages, network node records or databases, the activity of communication servers providing call forwarding, conferencing, voice mail, or other services, or other sources of communications system information. Moreover, this disposition information may be detected and collected by operation of a call disposition application 124.

Various conditions, resolutions, or states may comprise the disposition of an outgoing call. For example, a disposition may include unanswered. An "unanswered" disposition occurs when an outgoing call is terminated without being answered at the called communication device 108, 112. Another example of a possible disposition is answered. A call is "answered" when a communications session is established between the calling communication device 108, 112 and the called communication device 108, 112. An "outgoing-conferenced" disposition is another example of a possible outgoing call disposition. The "outgoing-conferenced" disposition occurs when user A, associated with a first communication device 108, 112, makes an outgoing call to user B, associated with a second communication device 108, 112, and then user A conferences the call. More particularly, the "outgoing-conferenced" disposition is applied when the call outgoing from the communication device 108, 112 of user A to the communication device 108, 112 of user B is conferenced to another communication device 108, 112. Another possible disposition of an outgoing call is "outgoing-transferred". The "outgoing-transferred" disposition occurs when user A makes an outgoing call from that user's communication device 108, 112 to the communication device 108, 112 of user B, and user B transfers the call to another communication device 108, 112. The disposition of an outgoing call is "forwarded" when user A makes an outgoing call from a communication device 108, 112 to user B at a called communication device 108, 112, and user B forwards the call to another communication device 108, 112. Yet another example of a disposition of an outgoing call is "voicemail". The disposition of an outgoing call is set to "voicemail" when user A makes a call from a communication device 108, 112 to another communication device 108, 112, and that call lands in a voice mailbox associated with the called communication device 108, 112.

The determined disposition of the outgoing call is then indicated in the call log for the communication device 108, 112 (step 416). This information can include a textual and/or graphical indication of the disposition of one or more calls in an outgoing call log. As can be appreciated by one of skill in the art, the indication of the disposition of an outgoing call can be implemented by setting a flag in software or in a message comprising some or all of the content of a call log associated with a communication device 108, 112. The disposition of a call can also be indicated by inserting the disposition information in a call log. Moreover, the call log for a communication device 108, 112 can be stored in memory 204 associated with a communication server 120, and/or in memory 332 associated with a communication device 108, 112.

At step 420, a determination is made as to whether the call log 444 has been accessed by a user of the communication device 108, 112 associated with that log. If the call log 444 has been accessed, the disposition of the outgoing calls is displayed to the user (step 424). After determining that the call log has not been accessed by the user, or after displaying the disposition of outgoing calls to the user, a determination may be made as to whether monitoring of outgoing calls should be continued (step 428). If monitoring of outgoing calls should be continued, the process returns to step 404, to listen for further outgoing calls. Alternatively, if monitoring is to be discontinued, the process ends.

As can be appreciated by one of skill in the art after consideration of the present disclosure, the disposition of a call, in accordance with embodiments of the present invention, can be determined through the operation of a call disposition application 124, alone or in association with other communications system 100 components. The call disposition application 124 may be executed by a communication server 120. The communication server 120 may provide communication services in addition to the services provided through execution of the call disposition application 124. Alternatively, a communication server 120 running a call disposition application 124 in accordance with embodiments of the present invention may provide only call disposition determination functions as described herein. Accordingly, a communication server 120 executing a call disposition application 124 may comprise an application server.

As discussed herein, the disposition of outgoing calls with respect to a communication device 108, 112 may be displayed to a user of such communication device 108, 112 by an included display 308. Alternatively or in addition, a call log associated with a communication device 108, 112 that includes outgoing call disposition information can be presented to a user, agent of the user, or administrator through a separate device, including another communication device, 108, 112, or an adjunct device. Moreover, although specific examples of outgoing call dispositions have been provided, other dispositions may be indicated in accordance with embodiments of the present invention. In particular, disposition information can include any information regarding an outgoing call, that is in addition to information identifying that outgoing call, and the fact that the call was placed. Moreover, a call log that includes outgoing call disposition information may be provided through other means, such as through a printed report, or a report delivered audibly, for example in connection with a text to speech application. Furthermore, the output from a call disposition application 124 may be stored electronically. In accordance with still other embodiments, a call disposition application 124 may be executed by the communication device 108, 112 used to place outgoing calls. In addition to voice telephony, embodiments of the present invention may also be applied to video telephony calls. Moreover, embodiments of the present invention may be applied to any communications system that supports communications between nodes.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:
1. A method, comprising:
 detecting a first outgoing call from a first communication device, wherein the first outgoing call is placed using the first communication device;
 determining a disposition of the first outgoing call, wherein the determined disposition of the first outgoing call is outgoing conferenced call, and wherein the determined disposition is based on a first user of the first communication device calling a second user of a second commu- nication device and the first user of the first communication device conferencing an additional user onto the first outgoing call;
including the first outgoing call in a call log for the first communication device;
indicating the determined disposition of the first outgoing call in the call log for the first communication device;
detecting a second outgoing call from the first communication device, wherein the second outgoing call is placed using the first communication device;
determining a disposition of the second outgoing call, wherein the determined disposition of the second outgoing call is outgoing forwarded call;
including the second outgoing call in the call log for the first communication device; and
indicating the determined disposition of the second outgoing call in the call log for the first communication device.

2. The method of claim 1, further comprising:
accessing by the first user the call log for the first communication device; and
displaying to the first user the determined disposition of the first outgoing call.

3. The method of claim 2, wherein the determined disposition of the first outgoing call is displayed to the first user by a display of the first communication device.

4. The method of claim 1, wherein the call log is stored in memory included in the first communication device.

5. The method of claim 1, further comprising:
receiving a communications system message, wherein the disposition of the first outgoing call is determined from the communications system message.

6. The method of claim 5, wherein the communications system message is received by a call disposition application running on a communication server, and wherein determining the disposition of the first outgoing call from the communications system message is performed by the call disposition application.

7. A communications system, comprising:
a first communication device, including:
a user input;
a user output;
a first communication server, wherein the first communication device is interconnected to the first communication server, the first communication server including:
memory;
a processor; and
application programming running on the processor of the first communication server, wherein the application programming:
determines the disposition of a first outgoing call placed from the first communication device, wherein the determined disposition of the first outgoing call is outgoing conferenced call and wherein the determined disposition is based on a first user of the first communication device calling a second user of a second communication device and the first user of the first communication device conferencing an additional user onto the first outgoing call;
provides the determined disposition of the call to the first communication device, wherein a plurality of calls are placed from the first communication device using a first communication network; and
determines the disposition of each of the plurality of calls placed from the first communication device, wherein the user output of the first communication device includes a visual display, and wherein the determined disposition of each of the plurality of calls is displayed to the first user by the user output of the first communication device.

8. The system of claim 7, wherein the application programming is stored in the memory of the first communication server.

9. The system of claim 7, wherein the determined disposition of the first outgoing call is displayed to the first user by the user output of the first communication device.

10. The system of claim 7, wherein the determined disposition of the first outgoing call placed from the first communication device is stored in the memory of the first communication server.

11. A communication server, comprising:
a network interface;
memory;
a processor; and
application programming executed by the processor in association with the memory, wherein the application programming determines the disposition of a first outgoing call placed from a first communication device, wherein the determined disposition of the first outgoing call is outgoing conferenced call, wherein the determined disposition is based on a first user of the first communication device calling a second user of a second communication device and the first user of the first communication device conferencing an additional user onto the first outgoing call, wherein a plurality of calls are placed from the first communication device using a first communication network, wherein the application programming determines the disposition of each of the plurality of calls placed from the first communication device, wherein the user output of the first communication device includes a visual display, and wherein the determined disposition of each of the plurality of calls is displayed to a user by the user output of the first communication device.

12. The communication server of claim 11, wherein the application programming provides the disposition of the first outgoing call placed from the first communication device to a call log for the first communication device.

13. The communication server of claim 12, wherein the application programming provides the disposition of the first outgoing call placed from the first communication device to the user.

14. The method of claim 1, further comprising:
accessing by a first user the call log for the first communication device; and
displaying to the first user the determined disposition of the second outgoing call.

15. The system of claim 7, wherein a determined disposition of a second outgoing call is outgoing forwarded call and wherein the determined disposition of the second outgoing call is based on the outgoing forwarded call being forwarded by a called user.

16. The communication server of claim 11, wherein a determined disposition of a second outgoing call is outgoing forwarded call and wherein the determined disposition of the second outgoing call is based on the outgoing forwarded call being forwarded by a called user.

17. The method of claim 1, wherein a determined disposition of a third outgoing call is one of answered, unanswered, and voice mail.

18. The system of claim 7, wherein a determined disposition of a second outgoing call is one of answered, unanswered, and voice mail.

19. The communication server of claim 11, wherein a determined disposition of a second outgoing call is one of answered, unanswered, and voice mail.

20. The method of claim 1 wherein a determined disposition of a third outgoing call is transferred.

* * * * *